(12) United States Patent
Weetman

(10) Patent No.: US 6,811,296 B2
(45) Date of Patent: Nov. 2, 2004

(54) AERATION APPARATUS AND METHOD

(75) Inventor: Ronald J. Weetman, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 63 days.

(21) Appl. No.: 10/295,913

(22) Filed: Nov. 18, 2002

(65) Prior Publication Data

US 2004/0095842 A1 May 20, 2004

(51) Int. Cl.⁷ .............................. B01F 3/04; B01F 13/02
(52) U.S. Cl. ........................................ 366/102; 261/93
(58) Field of Search ................................ 366/101, 102, 366/103, 104, 264; 261/93, 87

(56) References Cited

U.S. PATENT DOCUMENTS

| | | | | |
|---|---|---|---|---|
| 2,521,396 A | * | 9/1950 | Moui ........................... | 261/93 |
| 3,154,601 A | * | 10/1964 | Weston et al. ................ | 261/93 |
| 3,227,701 A | * | 1/1966 | Pennington ................... | 261/93 |
| 3,865,721 A | * | 2/1975 | Kaelin .......................... | 261/93 |
| 4,207,275 A | * | 6/1980 | Stanton et al. ................ | 261/93 |
| 4,239,515 A | * | 12/1980 | Yanagioka et al. ........... | 261/93 |
| 4,699,740 A | * | 10/1987 | Bollenrath .................... | 261/93 |
| 4,779,990 A | * | 10/1988 | Hjort et al. .................. | 366/102 |
| 4,882,098 A | * | 11/1989 | Weetman ...................... | 261/93 |
| 5,328,261 A | * | 7/1994 | Castano ....................... | 366/102 |
| 5,356,600 A | * | 10/1994 | Kiyonaga et al. ............. | 261/93 |
| 5,711,902 A | * | 1/1998 | Hsu ............................. | 261/93 |
| 5,791,780 A | * | 8/1998 | Bakker ....................... | 366/102 |
| 5,988,604 A | | 11/1999 | McWhirter .................. | 261/91 |
| 6,250,797 B1 | * | 6/2001 | Weetman ..................... | 261/93 |

* cited by examiner

Primary Examiner—Tony G. Soohoo
(74) Attorney, Agent, or Firm—Baker & Hostetler LLP

(57) ABSTRACT

The present invention provides an apparatus and method for mass transfer of gas or other fluids into a liquid and/or liquid suspension. The present invention is preferably used in conjunction with waste treatment processes and/or fermentation processes that are commonly carried out in a mixing vessel. In such an arrangement, the mass transfer process is utilized to contact air to liquid in a mixing vessel or aeration basin.

14 Claims, 4 Drawing Sheets

AERATION APPARATUS AND METHOD

FIELD OF THE INVENTION

The present invention relates to an improved aeration apparatus and method. More particularly, the present invention relates to an apparatus and method for dispersing gas or other fluids into a liquid. The invention is useful, for example, for use in waste treatment plants for introducing oxygen into wastewater where the oxygen is used by biological elements that digest waste. The invention is also useful in various other bio-reaction processes where the dispersion of air and/or oxygen is desired.

BACKGROUND OF THE INVENTION

In mass transfer processes such as waste treatment and bio-reactions, it is common to carry out these processes in an aeration vessel in which gas, such as oxygen or air, is introduced into a biodegradable liquid that contains micro-organisms. These aforementioned processes are oftentimes utilized by municipalities and industry to treat waste water wherein the object of the process is to introduce air to the liquid and then micro-organisms in the liquid proceed to use this oxygen to digest the waste. The gas is commonly introduced by way of fluid or aeration diffusers.

During the aeration treatment of the waste water, it is common to introduce the air through a series of submerged diffusers mounted at spaced positions along the length of a manifold pipe and/or a grid of piping that cover the bottom of the aeration basin. The diffusers commonly include apertures through which air can escape, usually as small bubbles. A common type of diffuser uses a rubber or rubber-like flexible diaphragm or a rigid disc, while other common types of diffuser comprise simply of piping having apertures for air release.

During operation of the diffuser, the piping delivers gas, usually air, under pressure to the diffusers, and each of the diffusers in turn generate relatively small bubbles in the liquid. Thus, air is delivered to the liquid in the aeration basin in the form of small bubbles throughout the extent of the basin to enhance the transfer of oxygen to the liquid for oxidation treatment of the liquid.

One disadvantage of the above described process is that it is very inefficient. The length of time required to effect the oxidation treatment can be as long as 24 hours. This time period combined with the fact that these waste treatment processes are oftentimes carried out continuously year round, provide a process that is very inefficient in terms of both time consumption and energy consumption.

Accordingly, it is desirable to provide aeration apparatus and method for effectuating the efficient dispersement or transfer of air and/or other gas into a liquid.

SUMMARY OF THE INVENTION

The foregoing needs are met, at least in part, by the present invention where, in one aspect, an aeration apparatus having a mixing vessel and a drive assembly that includes a drive shaft is provided. The aeration apparatus includes an aerator that is connected to the drive shaft. The aeration apparatus additionally includes at least one diffuser that disperses gas disposed within the mixing vessel.

In accordance with another aspect of the present invention, an aeration apparatus having a mixing vessel and a drive assembly that includes a drive shaft is provided. The aeration apparatus includes an aerator connected to the drive shaft along with at least one diffuser that disperses gas disposed within the mixing vessel. The aeration apparatus additionally includes an intermediate impeller that is also connected to the drive shaft.

In accordance with yet another aspect of the present invention, an aeration apparatus having a mixing vessel having side walls and a top and bottom and a drive assembly that includes a drive shaft is provided. The aeration apparatus includes a first impeller connected to the drive shaft and a second impeller connected to the drive shaft. The aeration apparatus also includes at least one diffuser that disperses gas disposed within the mixing vessel.

In accordance with still another aspect of the present invention, an aeration apparatus having a mixing vessel having side walls and a top and bottom and a drive assembly that includes a drive shaft is provided. The aeration vessel includes a draft tube disposed within the vessel and an impeller connected to the drive shaft that is disposed within the draft tube. The aeration apparatus also includes at least one diffuser that disperses gas disposed within the mixing vessel.

In accordance with another aspect of the present invention, an aeration apparatus having a mixing vessel and a drive assembly that includes a drive shaft is provided. The aeration apparatus includes a means for agitating the liquid and a means for dispersing gas and/or air into the liquid wherein the means for dispersing the gas and/or air is disposed within the mixing vessel.

In accordance with yet another aspect of the present invention, a method for aerating a liquid in a mixing vessel is provided, comprising the steps of: agitating the liquid using a surface aerator; and dispersing gas and/or air into the liquid using a diffuser disposed within the mixing vessel.

There has thus been outlined, rather broadly, several features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides an apparatus and method for mass transfer of gas and/or air into a liquid and/or liquid suspension. The present invention is preferably used in conjunction with waste treatment processes and/or fermentation processes that are commonly carried out in a mixing vessel. In such an arrangement, the mass transfer process is utilized to contact air to liquid in a mixing vessel or aeration basin. It should be understood, however, that the present invention is not limited in its application to waste treatment, but, for example, can be used with other processes requiring liquid aeration.

Figure 1:
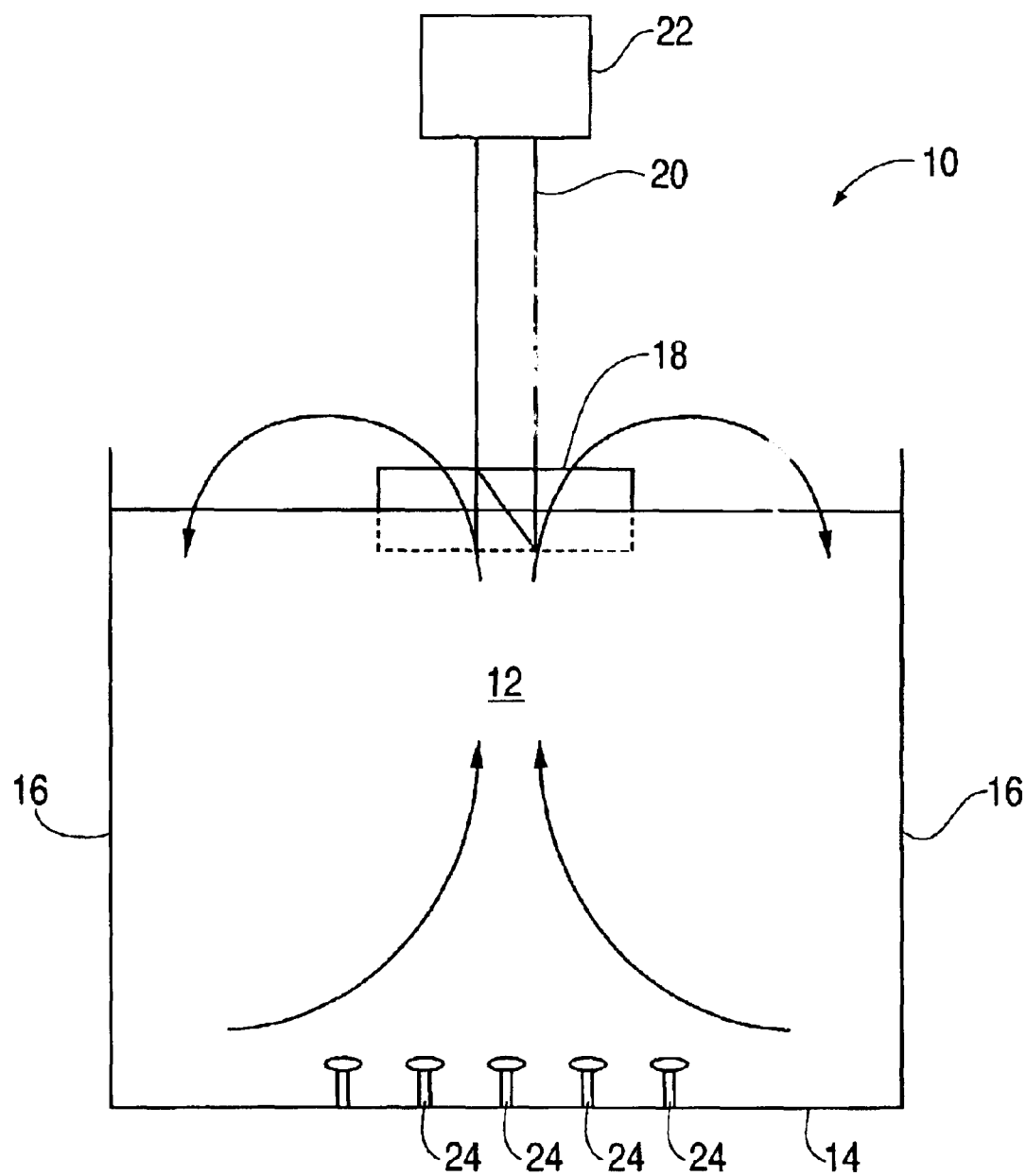
FIG. 1 is a schematic side view of an aeration apparatus in accordance with an embodiment of the present invention.

Referring now to the figures, wherein like reference numerals indicate like elements, FIG. 1 shows a schematic side view of an aeration apparatus in accordance with an embodiment of the present invention. The aeration apparatus 10 has a vessel or aeration basin 12 having a bottom wall 14 and side walls 16. The aeration apparatus 10 is filled with liquid that is circulated and aerated by a surface aerator 18. The surface aerator is connected to a shaft 20 of a drive system 22 that includes a motor and/or gear box.

The surface aerator 18 depicted in FIG. 1 may be of any conventional type of surface aerator impeller commonly utilized in aeration processes. These aerator impellers commonly employ a series of blades and/or a series of blades and disc that aerate a liquid in a mixing vessel.

As depicted in FIG. 1, the diffusers 24 may be of conventional diffuser type dispersing a fine bubble gas and/or a course bubble gas. In the embodiment described, the diffusers 24 function to assist the surface aerator 18 in the transfer of air to the liquid. Diffusers are typically mounted at regularly spaced intervals on a grid of piping covering the bottom of aeration vessel 12. In the embodiment illustrated in FIG. 1, the diffusers 24 are positioned so that they assist the surface aerator 18 in pumping the fluid. The aforementioned positioning of the diffusers 24 preferably includes placing the diffusers 24 in the center of the vessel 12 and/or centering the diffusers 24 underneath the aeration impeller 18. The diffuser positioning preferably further includes placing the diffusers 24 within a circle having a diameter equal to three times the diameter of the surface aerator 18 diameter. Alternatively, a single diffuser may be employed or multiple diffusers may employed, depending on the aeration apparatus application. Similarly, the spacing between the individual diffusers can also vary.

During operation, the shaft 20 is driven by the drive system 22 and rotates the surface aerator 18. The surface aerator 18 proceeds to circulate the liquid in the vessel 12 principally in both the axial and radial directions. In the embodiment depicted, the aerator 18 pumps the liquid in a generally upward direction, and then outward, away from the aerator 18, towards the vessel 12 side walls 16. See the flow path of the liquid designated by the arrows. As the liquid is pumped by the aerator 18, it is contacted by air causing air bubbles to be trapped in the liquid.

Meanwhile, as the surface aerator 18 is pumping the liquid as previously described, the diffuser 24 introduces bubbles of air, fine and/or course, into the liquid simultaneously. This interaction between the surface aerator 18 and diffusers 24 results in increased air transfer to the liquid. As previously described, by placing the diffusers 24 under the surface aerator 18, the diffusers assist in the circulation and pumping of the liquid. Therefore, an increase in the overall mass transfer of the mixer or mixing apparatus results.

The aforementioned combination of the surface aerator 18 and diffusers 24 also offers the mixer or mixer assembly end user multiple options in terms of oxygen demand. Utilization of the surface aerator 18 and diffusers 24 can vary and the oxygen demand varies. For example, the surface aerator 18 speed and/or submergence level can varied during operation. Alternatively, the amount of gas or air supplied to the diffusers can be varied.

Figure 2:
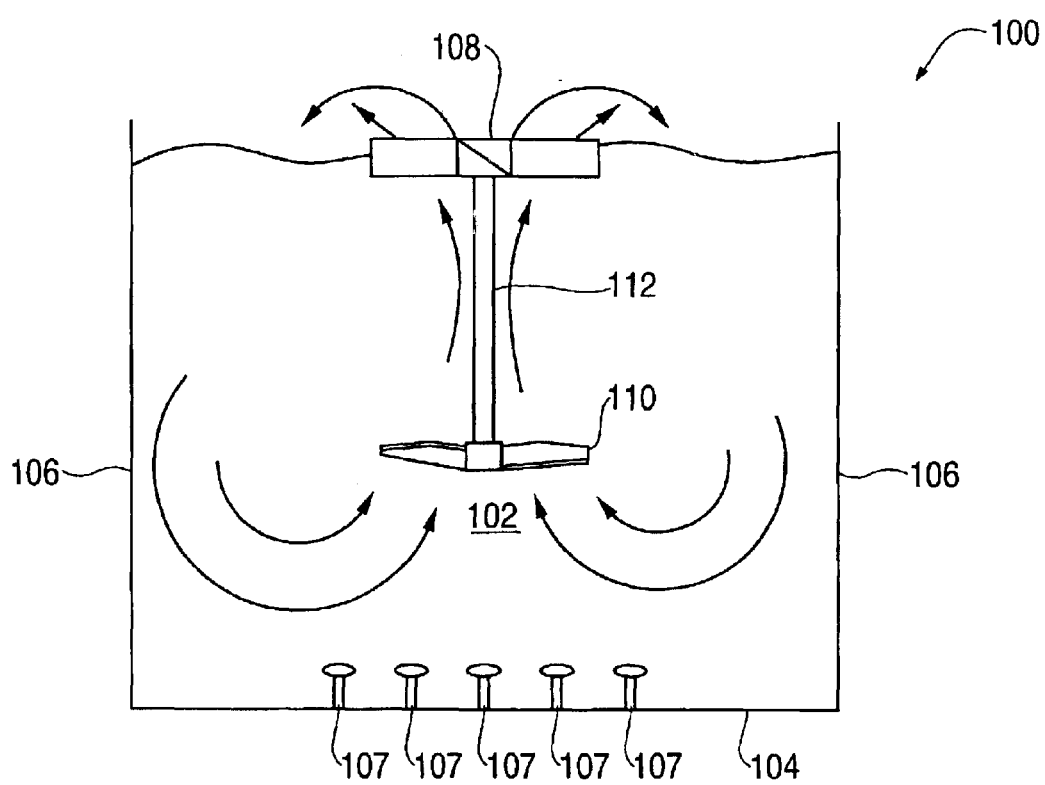
FIG. 2 is a schematic side view of an aeration apparatus having a surface aerator and an intermediate impeller in accordance with an embodiment of the present invention.

Referring now to FIG. 2, an aeration apparatus is depicted schematically and designated generally by the numeral 100. The aeration apparatus 100 has a vessel or aeration basin 102 having a bottom wall 104 and a side wall 106 wherein the bottom wall has diffusers 107 connected thereto. The aeration apparatus 100 is filled with liquid that is circulated and aerated by a surface aerator 108. The apparatus 100 additionally includes an intermediate impeller 110 preferable positioned between the diffusers 107 and the surface aerator 108. Both the surface aerator 108 and the intermediate impeller 110 are connected to a shaft 112. The shaft 112 is connected to a drive system (not pictured) that may include a motor and/or gearbox. During operation of the aeration apparatus, both the surface aerator 108 and the intermediate impeller 110 rotate in the same direction and preferably at similar rates.

The surface aerator 108 depicted in FIG. 2 may be of any conventional type of surface aerator commonly utilized in aeration processes. These aerators commonly employ a series of blades and/or a series of blades and a disc that aerate a liquid in the mixing vessel.

The diffusers 107 illustrated in FIG. 2 are of the conventional diffuser type that disperse either a five bubble gas and/or a course bubble gas. In the embodiment depicted, the diffusers 107 function to assist the surface aerator 108 in the transfer of air to the liquid. Diffusers 107 like the examples shown in FIG. 2, are typically mounted are regularly spaced intervals on a grid of piping (not pictured) that usually covers the bottom of the aeration vessel 102. In this embodiment, five (5) diffusers 107 are illustrated and they are preferably positioned at the center of the aeration vessel 102. This embodiment of the present invention is not limited to five diffusers 107 and commonly may employ more or less, depending upon the aeration apparatus 100 application.

The aforementioned combination of the surface aerator 108 and diffusers 107 also offers the mixer or mixer assembly end user multiple options in terms of oxygen demand. Utilization of the surface aerator 108 and diffusers 107 can vary and the oxygen demand varies. For example, the surface aerator 108 speed and/or submergence level can varied during operation. Alternatively, the amount of gas or air supplied to the diffusers can be varied.

During operation, the shaft 112 is rotated by the drive system which in turn causes the both the surface aerator 108 and the intermediate impeller 110 to be driven or rotated. As illustrated in FIG. 2, the liquid is pumped in a generally cyclic pattern (as depicted by the arrows). The surface aerator 108 aerates the liquid while pumping liquid in a generally upward and outward direction. The intermediate impeller 110 assists in the circulation of the liquid and increases liquid flow by pumping the liquid located in intermediate and bottom depths of the vessel 112 in the generally upward direction towards the surface aerator 108. Overall the liquid continued in the vessel 112 is pumped in a generally upward and outward direction, away for from the aerator 108 and towards the side walls 106, as designated by the arrows.

As previously described in the embodiment depicted in FIG. 2, the diffusers 107 bubbles of air, fine and/or course, into the liquid simultaneously as the surface aerator 108 and intermediate impeller 110 are aerating and circulating the liquid. This interaction between the surface aerator 108, impeller 110 and diffusers 24 results in increased air transfer to the liquid. As previously described, by placing the diffusers 107 under the surface aerator 108, the diffusers assist in the circulation and pumping of the liquid. Therefore, an increase in the overall mass transfer of the mixer or mixing apparatus results.

The aforementioned combination of the surface aerator 108 and diffusers 107 also offers the mixer or mixer assembly end user multiple options in terms of oxygen demand. Utilization of the surface aerator 108 and diffusers 107 can vary and the oxygen demand varies. For example, the surface aerator 108 speed and/or submergence level can varied during operation. Alternatively, the amount of gas or air supplied to the diffusers can be varied.

The apparatus 100 depicted in may alternatively be utilized for anaerobic processes and applications. The processes may be carried out in the apparatus by shutting off the diffusers 107 and lowering the liquid to a level so that the liquid does not come into contact with the surface aerator 108. In these applications, the intermediate impeller 110 functions to circulate the liquid while the anaerobic process is being carried out.

Figure 3:
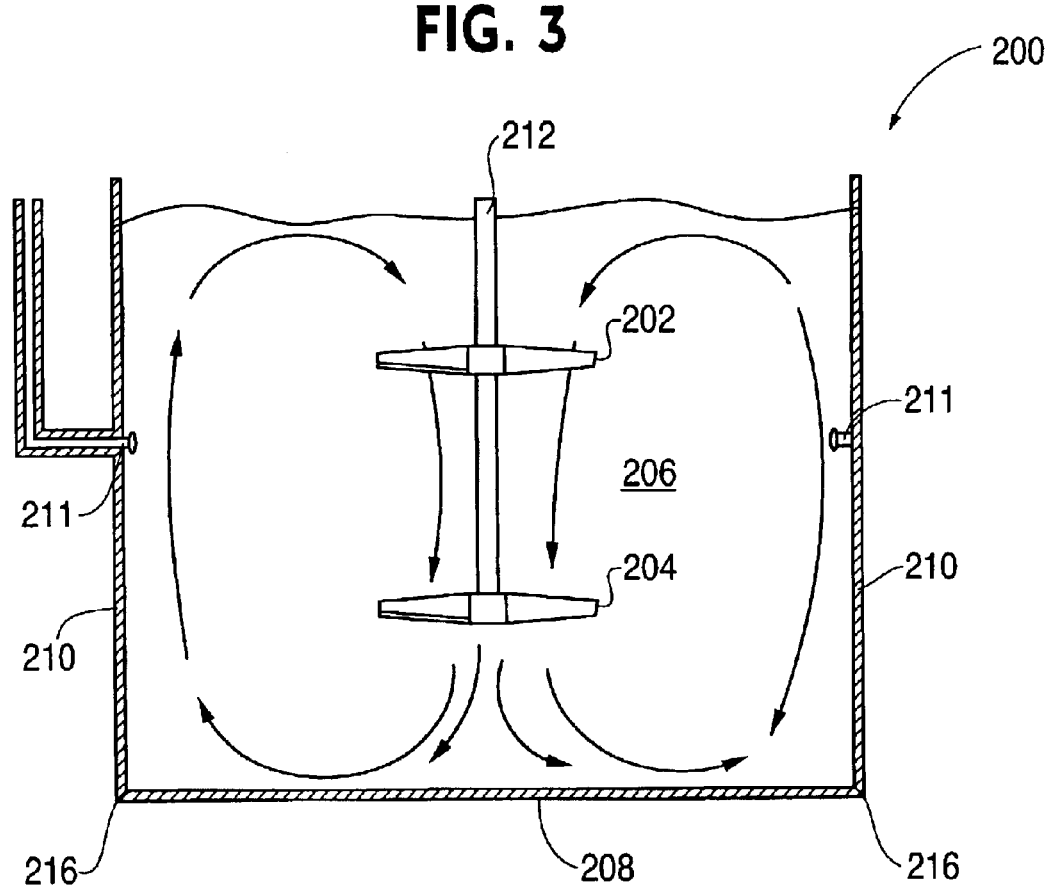
FIG. 3 is a schematic side view of an aeration apparatus having two intermediate impellers in accordance with an embodiment of the present invention.

Referring now to FIG. 3, a schematic side view of an aeration apparatus 200 having a first intermediate axial impeller 202 and a second intermediate axial impeller 204 in accordance with an embodiment of the present invention is illustrated. The aeration apparatus 200 has a vessel or aeration basin 206 having a bottom wall 208 and side walls 210. The side walls 210 preferably have two diffusers 211 attached thereto. The vessel 206 is filled with liquid that is circulated by the first and second impellers 202, 204. The impellers 202, 204 are axial flow impellers that are connected to a shaft 212 which is connected to a drive system (not pictured) that may include a motor and/or gearbox. During operation of the aeration apparatus 200, both impellers 202, 204 rotate in the same direction and at preferably similar rates.

As previously mentioned, the impellers are preferably high circulating, axial flow impellers 202, 204 that flow the liquid in a generally cyclic pattern, down the center of the vessel 206 and up the side walls 210. The diffusers 211 are the conventional diffuser type that disperse a fine bubble gas and/or a course bubble gas. They are preferably positioned near or on the side walls 210 to assist the flow pattern of the axial flow impellers 202, 204. In addition, the diffusers 211 are preferably positioned at a midway height in the vessel 206 so that the required pressure and power consumption of the compressors that supply the diffused air is reduced.

Alternatively, the diffusers 211 may be positioned near the bottom 208 and side 210 walls, near the corners of the vessel, generally, designated by numeral 214. While in this position the diffusers 211 most likely will use more power to pump the air, the benefits of this diffuser position include pressure gain in terms of mass transfer and the distance is the air bubble must travel to reach the liquid surface is greater, increasing air transfer.

During operation, the shaft 212 is rotated by the drive system, powering both intermediate, axial impellers 202, 204. As illustrated in FIG. 3, the liquid is pumped in a generally cyclic patterned (as depicted by the arrows) while being aerated by the diffusers 211 mounted on the side walls 210.

Alternative embodiments of the aeration apparatus depicted in FIG. 3 may include apparatuses that pump liquid in a pattern other than a downward cyclic one, for example, alternative embodiments may "up pump" the liquid. In addition, alternative embodiments may employ only a single impeller and diffuser or multiple impellers and diffusers.

Figure 4:
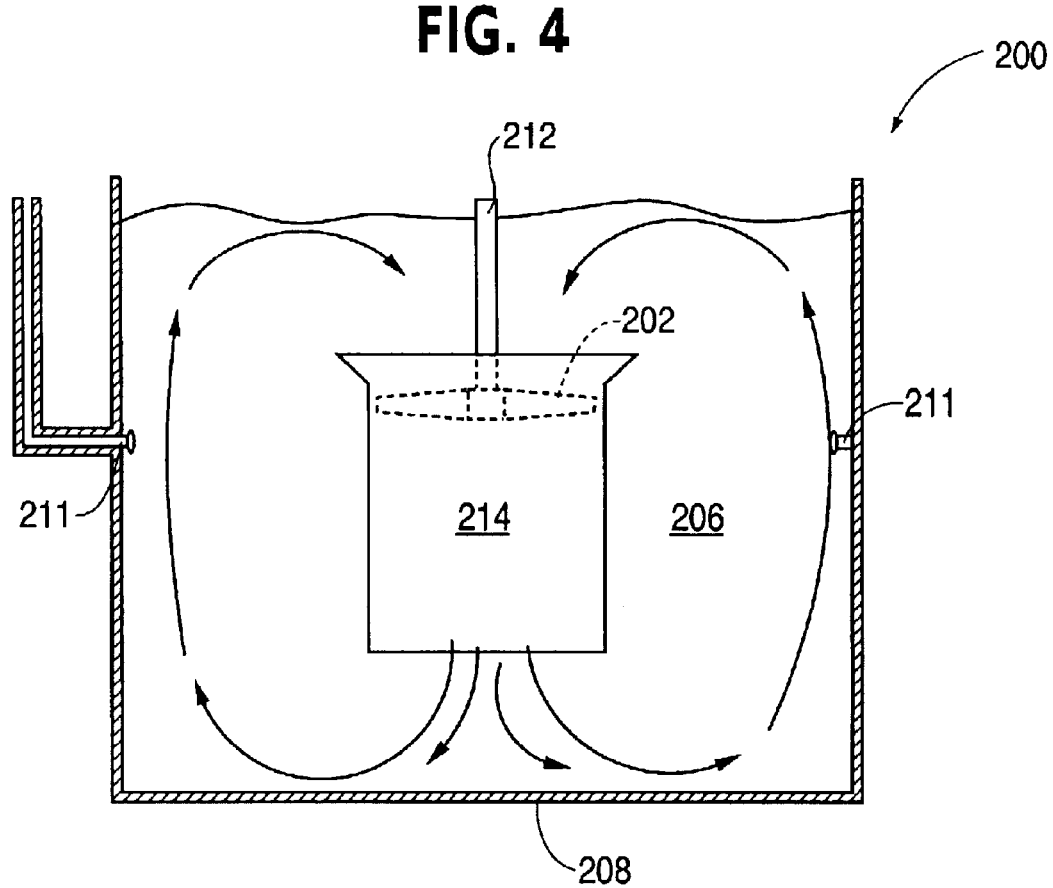
FIG. 4 is a schematic side view of an aeration apparatus having an intermediate impeller and a draft tube in accordance with an embodiment of the present invention.

An alternative embodiment the aeration apparatus illustrated in FIG. 3 is depicted in FIG. 4 and generally designated by the numeral 300. Unlike the aeration apparatus 300 depicted in FIG. 3 that employs two intermediate axial flow impellers 202, 204, the alternative embodiment illustrated in FIG. 4 preferably employs only a single axial flow impeller 202. In addition, the aeration apparatus 300 has a draft tube 214 that is utilized to isolate the diffusers 211 from the flow of the liquid.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An aeration apparatus having a mixing vessel and a drive assembly that includes a drive shaft, comprising multiple diffusers disposed within the vessel that disperse gas disposed within said vessel, wherein said diffusers are positioned under the surface aerator, wherein said diffusers are spaced within a circle having a diameter equal to three times said aerator diameter.

2. The aeration apparatus according to claim 1 wherein said aerator includes a series of blades.

3. The aeration apparatus according to claim 1 wherein the gas is air.

4. The aeration apparatus according to claim 3, wherein the air is dispersed in the form of fine bubbles.

5. The aeration apparatus according to claim 3, wherein the air is dispersed in the form of course bubbles.

6. The aeration apparatus according to claim 1, wherein said aerator includes a series of blades combined with a disc.

7. An aeration apparatus having a mixing vessel and a drive assembly that includes a drive shaft, comprising:

an aerator connected to the drive shaft;

a plurality of diffusers that disperse as disposed within the mixing vessel; and an intermediate impeller connected to the drive shaft, wherein said diffusers are spaced within a circle having a diameter equal to three times said aerator diameter.

8. The aeration apparatus according to claim 7, wherein said aerator includes a series of blades.

9. The aeration apparatus according to claim 7, wherein said intermediate impeller is an axial flow impeller.

10. The aeration apparatus according to claim 7, wherein said impeller is connected to said drive shaft at a position located between said aerator and said at least one diffuser.

11. The aeration apparatus according to claim 7, wherein said plurality diffusers are positioned under the surface aerator.

12. The aeration apparatus according to claim 7, wherein said aerator includes a series of blades combined with a disc.

13. A method for aerating a liquid in a mixing vessel, comprising:

agitating the liquid using a surface aerator connected to a drive shaft; and dispersing gas or air into the liquid using a multiple diffusers that disperse gas, wherein the multiple diffusers are disposed within the mixing vessel and are positioned under the surface aerator, and wherein the diffusers are spaced within a circle having a diameter equal to three times the aerator diameter.

14. An aeration apparatus having a mixing vessel and a drive assembly that includes a drive shaft, comprising:

agitating the liquid using a surface aerator connected to a drive shaft; and dispersing gas into the liquid using a multiple diffusers that disperse gas, wherein the multiple diffusers are disposed within the mixing vessel and are positioned under the surface aerator, and wherein the diffusers are spaced within a circle having a diameter equal to three times the aerator diameter.

* * * * *